(12) United States Patent
Xu

(10) Patent No.: US 12,316,150 B2
(45) Date of Patent: May 27, 2025

(54) CHARGE SYSTEMS WITH A BI-DIRECTIONAL LINEAR CHARGER AND ASSOCIATED OPERATING METHODS

(71) Applicant: Chengdu Monolithic Power Systems Co., Ltd., Chengdu (CN)

(72) Inventor: Min Xu, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 628 days.

(21) Appl. No.: 17/683,987

(22) Filed: Mar. 1, 2022

(65) Prior Publication Data

US 2022/0294248 A1 Sep. 15, 2022

(30) Foreign Application Priority Data

Mar. 11, 2021 (CN) .......................... 202110265128.0

(51) Int. Cl.
*H02J 7/00* (2006.01)
*H02M 1/00* (2006.01)

(52) U.S. Cl.
CPC .......... *H02J 7/0068* (2013.01); *H02J 7/0063* (2013.01); *H02J 7/007182* (2020.01); *H02M 1/007* (2021.05); *H02J 2207/20* (2020.01)

(58) Field of Classification Search
CPC .. H02J 7/0068; H02J 7/0063; H02J 7/007182; H02J 2207/20; H02M 1/007
USPC .......................................................... 320/132
See application file for complete search history.

(56) References Cited

U.S. PATENT DOCUMENTS

| 9,711,975 | B2 | 7/2017 | Xu et al. | |
| 9,882,405 | B2 | 1/2018 | Xu et al. | |
| 2014/0184173 | A1* | 7/2014 | Szepesi | H02J 7/0068 |
| | | | | 320/164 |

* cited by examiner

*Primary Examiner* — Zixuan Zhou
(74) *Attorney, Agent, or Firm* — Perkins Coie LLP

(57) ABSTRACT

A charge system having a bi-directional linear charger is provided, The charge system is used to provide interrupted power to a load, The charger system has an input interface for receiving a supply voltage, an output interface for outputting a system voltage to the load, a DC/DC voltage regulator coupled between the input interface and the output interface, a charging electrical pathway from an output terminal of the DC/DC voltage regulator to the battery through the linear charger, and a discharge electrical pathway from the battery to the output interface through the linear charger. The linear charger operates in a linear regulating charge mode along the charging electrical pathway to charge the battery and operate in a discharge mode along the discharge electrical pathway to supply the load.

15 Claims, 7 Drawing Sheets

CHARGE SYSTEMS WITH A BI-DIRECTIONAL LINEAR CHARGER AND ASSOCIATED OPERATING METHODS

CROSS-REFERENCE TO RELATED APPLICATION

This application claims the benefit of CN application No. 202110265128.0 filed on Mar. 11, 2021 and incorporated herein by reference.

TECHNICAL FIELD

This disclosure relates generally to electrical circuit, and more particularly but not exclusively relates to a charge system for providing a system voltage to a load and associated operating method.

BACKGROUND

Linear charger IC is widely used in the applications where a charging current is not high but a minimum charging current is concerned. In some applications, such as GSM (Global System for Mobile) communications in T-box and E-call, there is a need for uninterrupted power supply.

FIG. 1 schematically illustrates a prior charge system 100. As shown in FIG. 1, the charge system 100 comprises an input interface 101, a buck converter 102, an output interface 103, a boost converter 104, a linear charger 105, a rechargeable battery 106 and a switch 107. There is a charging electrical pathway from the input interface 101 to the battery 106 sequentially through the buck converter 102, the boost converter 104 and the linear charger 105. The input interface 101 receives an input voltage (12V typically) from a car power supply. The buck converter 102 steps down the input voltage at the input interface 101 to an appropriate value (e.g., 4.2V) which is provided to the load coupled to the output interface 103. The boost converter 104 and the linear charger 105 is configured to receive the output voltage of the buck converter 102, and provides a charging current to charge the battery 106, to keep the battery voltage remain at 3-4.2V. There is a discharging electrical pathway from the battery 106 to the output interface 103 through the switch 107. When the power supply at the input interface 101 fails, the switch 107 is turned OFF, the battery 106 discharges through the switch 107 to provide the appropriate system voltage to the load coupled to the output interface 103. However, the linear charger 105 shown in FIG. 1 only can work in one direction.

SUMMARY

In accomplishing the above and other objects, there has been provided a charge system for supplying a load. The charge system comprises a rechargeable battery, an input interface configured to receive a supply voltage, an output interface configured to output a system voltage to the load, a DC/DC voltage regulator, a charging electrical pathway and a discharge electrical pathway. The DC/DC voltage regulator is coupled between the input interface and the output interface and converts the supply voltage into the system voltage. The charging electrical pathway is from an output terminal of the DC/DC voltage regulator to the battery through a linear charger. The discharge electrical pathway from the battery to the output interface through the linear charger. Wherein the linear charger operates in a linear regulating charge mode along the charging electrical pathway and operate in a discharge mode along the discharge electrical pathway.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Those skilled in the art should understand that the meanings of the terms identified above do not necessarily limit the terms, but merely provide illustrative examples for the terms.

Figure 1:
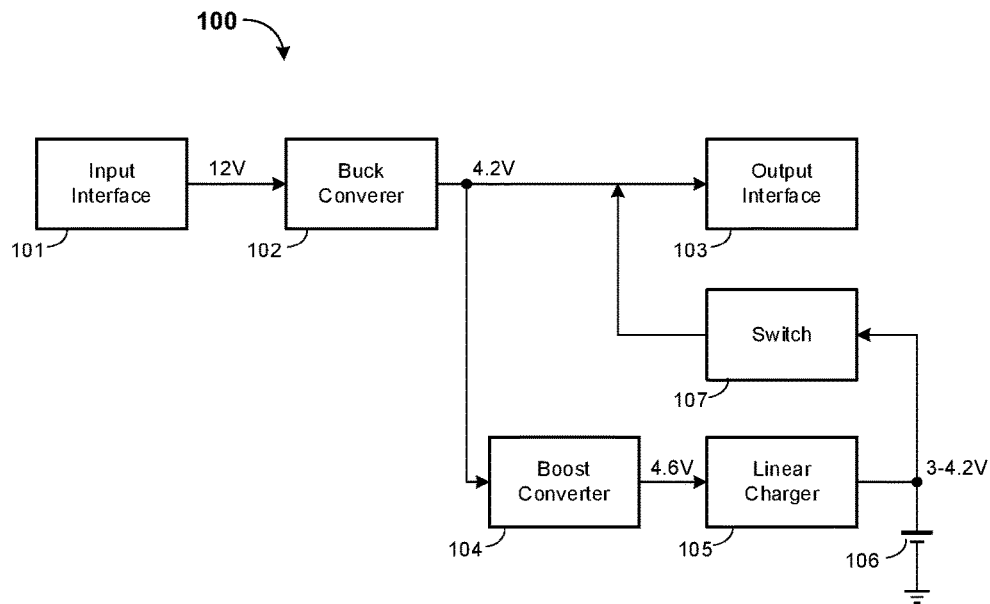
FIG. 1 schematically illustrates a prior charge system 100.
Figure 2:
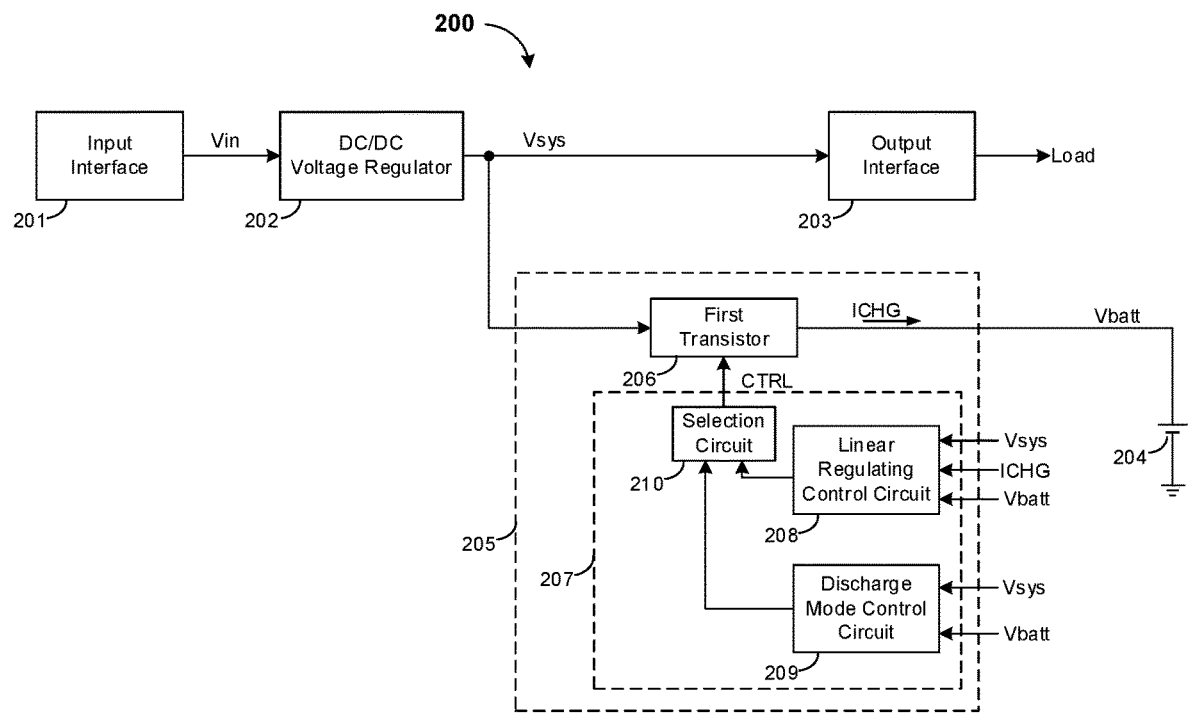
FIG. 2 schematically illustrates a charge system 200 according to an embodiment of the present invention.

FIG. 2 schematically illustrates a charge system 200 according to an embodiment of the present invention. The charge system 200 is used to provide interrupted power to a load, such as a GSM device. The charge system 200 comprises an input interface 201, a DC/DC voltage regulator 202, an output interface 203, a rechargeable battery 204, a charging electrical pathway and a discharge electrical pathway. Wherein the charging electrical pathway is from an output terminal of the DC/DC voltage regulator 202 to the battery 204 through a linear charger 205, and the discharge electrical pathway is from the battery 204 to the output interface 203 through the linear charger 205. The input interface 201 is configured to receive a supply voltage Vin from an external power supply such as a car battery. The DC/DC voltage regulator 202 is coupled between the input interface 201 and the output interface 203 and is configured to convert the supply voltage Vin into the system voltage Vsys for a load. In one embodiment, the supply voltage Vin is 12V. The linear charger 205 operates bi-directionally and operates in a linear regulating charge mode along the charging electrical pathway to charge the battery and operate in a discharge mode along the discharge electrical pathway.

In the example shown in FIG. 2, the linear charger 205 comprises a first transistor 206 and a first control circuit 207. The first transistor 206 has a first terminal, a second terminal and a control terminal, wherein the first terminal is coupled to the output terminal of the DC/DC voltage regulator 202, the second terminal is coupled to a positive terminal of the battery 204. The first control circuit 207 is coupled to the control terminal of the first transistor 206 for providing a control signal CTRL, to switch the linear charger 205 to operate in the linear regulating charge mode or the discharge mode.

In the example shown in FIG. 2, the first control circuit 207 comprises a linear regulating control circuit 208, a discharge mode control circuit 209 and a selection circuit 210. Base on a linear regulating control signal provided by the linear regulating control circuit 208, the linear charger 205 is configured to operate in the linear regulating charge mode and charge to the battery 204. When a difference between the battery voltage Vbatt and the system voltage Vsys is higher than a first threshold voltage Vth1, the selection circuit 210 is configured to select the linear regulating mode control signal instead of the discharge mode control signal provided by the discharge mode control circuit 209. And the linear circuit 205 exits the discharge mode and enters into the linear regulating charge mode. Base on the discharge mode control signal provided by the discharge mode control circuit 209, the linear charger 205 is configured to operate in the discharge mode, the battery 204 supplies the load along the discharge electrical pathway. In one embodiment, the first threshold voltage Vth1 is 30 mV. In other embodiment, the first threshold voltage Vth1 can be other appropriate value.

In detail, the linear regulating control circuit 208 is configured to receive the system voltage Vsys, a battery voltage Vbatt and a charging current ICHG to charge the battery 206, based on the system voltage Vsys, the battery voltage Vbatt and the charging current ICHG, the linear regulating control circuit 208 is configured to generate the linear regulating control signal. When the linear charger 205 is powered up, the output terminal of DC/DC voltage regulator 202 is configured to charge the battery 204 along the charging electrical pathway, until the battery 204 is charged to be a desired value, e.g., 4.2V.

When the difference between the battery voltage Vbatt and the system voltage Vsys is higher than the first threshold voltage Vth1, the selection circuit 210 is configured to select the discharge mode control signal generated by the discharge mode control circuit 209 to control the first transistor 206. And the linear charger 205 enters into the discharge mode and exits from the linear regulating charge mode, and the battery 204 discharge to supply the load along the discharge electrical pathway. When a difference between the system voltage Vsys and the battery voltage Vbatt exceeds a third threshold voltage Vth3, the selection circuit 210 is configured to select the linear regulating control signal generated by the linear regulating control circuit 208, to control the first transistor 206, the battery 204 stops discharging to the load, the linear charger 205 enters the linear regulating charge mode from the discharge mode. In one embodiment, the third threshold voltage Vth3 is 100 mV.

In a further embodiment, the discharge mode control circuit 209 comprises an error amplifier (not shown). The error amplifier is configured to receive the system voltage Vsys, the battery voltage Vbatt and the second threshold voltage Vth2. Wherein in discharge mode, the battery 204 discharges to supply the load along the discharging electrical pathway, the first transistor 206 is reversely fully on, a current flows from the battery 204 to the output interface 203. In one embodiment, the difference between the battery voltage Vbatt and the system voltage Vsys is controlled to be higher than or equal to the second threshold voltage Vth2. In one embodiment, the second threshold Vth2 is 25 mV, which is less than the first threshold voltage Vth1.

In the linear regulating charge mode, when the difference between the system voltage Vsys and the battery voltage Vbatt is higher than the third threshold voltage Vth3, the first transistor 206 is controlled by the linear regulating control circuit 208. And the second terminal of the first transistor 206 charges with constant current to the batter 204, the battery voltage Vbatt increases continuously. When the battery voltage Vbatt increases to a battery regulating voltage Vbatt_reg, the second terminal of the first transistor 206 charges with constant voltage to the battery 204, and the battery voltage Vbatt no longer increase and keeps constant. In one embodiment, the linear regulating control circuit 208 can comprise a CC (constant current) control loop, a CV (constant voltage) control loop and a linear regulating logic circuit. When the difference between the system voltage Vsys and the battery voltage Vbatt is higher than the third threshold voltage Vth3, the linear regulating logic circuit selects the CC control loop to work and configure the second terminal of the first transistor to charge the battery 204 with constant current. When the battery voltage Vbatt increases to the battery regulating voltage Vbatt_reg, the linear regulating logic circuit selects the CV control loop to work and configure the second terminal of the first transistor to charge the battery 204 with constant voltage.

Figure 3:
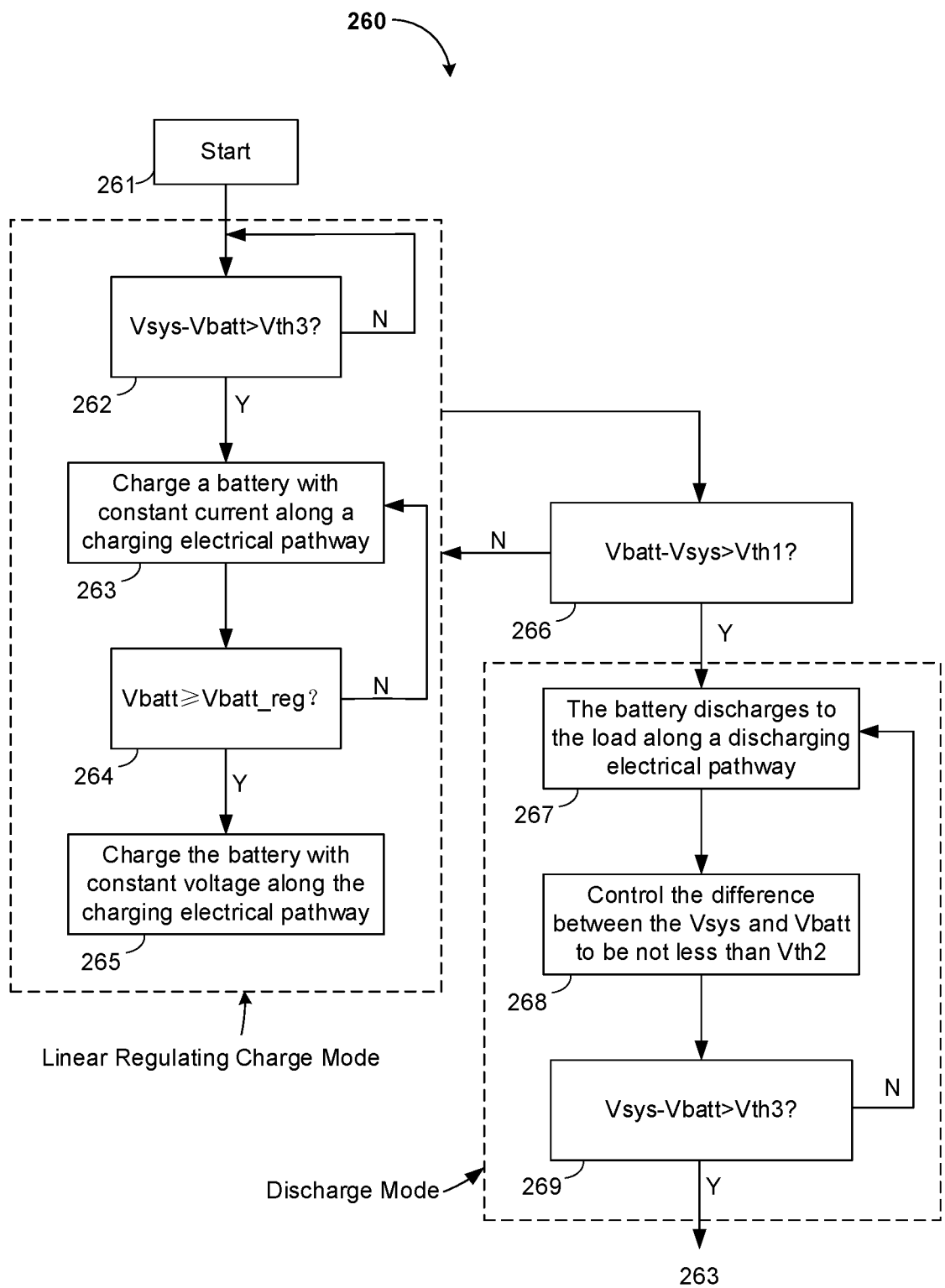
FIG. 3 illustrates a flow chart of an operating method 260 for a charge system according to one embodiment of the present invention.

FIG. 3 illustrates a flow chart of an operating method 260 for a charge system according to one embodiment of the present invention. As shown in FIG. 3, the method 260 comprises steps 261~269.

At step 261, the charge system 200 starts to power up. The linear regulating charge mode comprises steps 262~265.

At step 262, whether the difference between the system voltage Vsys and the battery voltage Vbatt is higher than the third threshold voltage Vth3 is sensed. In one embodiment, Vth3 is 100 mV. When the sensing result is yes, the flow goes into step 263. Otherwise, back to the step 262.

At step 263, charge the battery 204 with constant current along the charging electrical pathway. In one embodiment, the CC control loop of the linear regulating control circuit is configured to control the first transistor 206, and the second terminal of the first transistor is configured to charge the battery 204 with constant current, the battery voltage Vbatt continuous to increase.

At step 264, whether the battery voltage Vbatt increased to the battery regulating voltage Vbatt_reg is sensed. If the result is yes, the flow goes into step 265. Otherwise, back to the step 263.

At step 265, charge the battery with constant voltage along the charging electrical pathway. In one embodiment, the CV control loop of the linear regulating control circuit is configured to control the first transistor 206, and the second terminal of the first transistor is configured to charge the battery 204 with constant voltage, the battery voltage Vbatt keeps constant.

At step 266, whether the difference between the battery voltage Vbatt and the system voltage Vsys is higher than the first threshold voltage Vth1 is sensed. In one embodiment, Vth1=30 mV. When the sensing result is yes, the flow switches to the discharge mode from the linear regulating charge mode, and goes into step 267. Wherein the discharge mode comprises steps 267~269.

At step 267, the battery 204 discharges along the discharging electrical pathway, to supply the load coupled to the output interface 203.

At step 268, the difference between the system voltage Vsys and the battery voltage Vbatt is controlled to be higher than or equal to the second threshold voltage Vth2. In one embodiment, Vth2 is 25 mV.

At step 269, whether the difference between the system voltage Vsys and the battery voltage Vbatt is higher than the third threshold voltage Vth3 is sensed. If yes, the linear charger 205 enters the linear regulating charge mode from the discharge mode, and the discharging electrical pathway is blocked. Otherwise, back to step 267 and keep the discharge mode, the battery 204 continuous to discharge and supplies the load through the linear charger 205.

In practical applications, if there is no load coupled to the output interface 203, and the output voltage of the DC/DC voltage regulator is 5V, the battery voltage is 3V, the dissipation power of the linear charger will be high.

Figure 4:
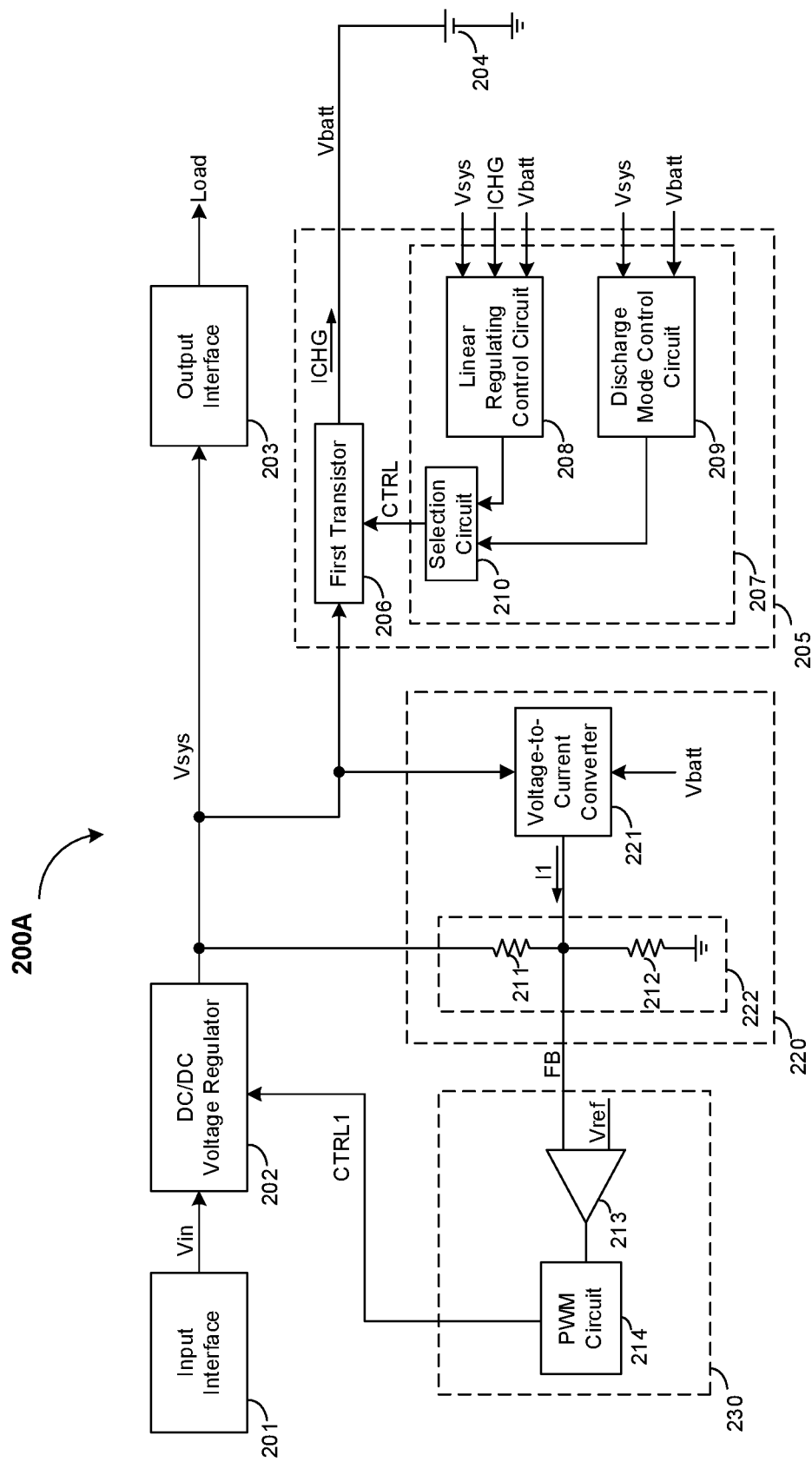
FIG. 4 illustrates a charge system 200A according to another embodiment of the present invention.

FIG. 4 illustrates a charge system 200A according to another embodiment of the present invention. Compared with the charge system 200 shown in FIG. 2, the difference is that the charge system 200A shown in FIG. 4 further comprises a system voltage feedback circuit 220 and a voltage regulator control circuit 230. In the example shown in FIG. 4, when the linear charger 205 operates in the linear regulating charge mode, the output voltage of the DC/DC voltage regulator is regulated to make the input voltage of the linear charger 205 just enough to keep the linear charger 205 operation. With this configuration, the power dissipated in the linear charger 205 will be reduced greatly and thus improving the efficiency of the charge system 200A.

As shown in FIG. 4, the system voltage feedback circuit 220 is coupled to the first terminal of the first transistor 206 to receive the system voltage Vsys, and is coupled to the second terminal of the second transistor 206 to receive the battery voltage Vbatt. Based on the system voltage Vsys and the battery voltage Vbatt, the system voltage feedback circuit 220 generates the system voltage feedback signal FB at the output terminal to regulate the system voltage Vsys at the first terminal of the first transistor 206. And thus the system voltage Vsys is regulated to approach or substantially equal to a sum of the battery voltage Vbatt and the voltage across the first transistor 206.

In the example shown in FIG. 4, the system voltage feedback circuit 220 comprises a voltage-to-current converter 221 and a voltage divider 222. The voltage-to-current converter 221 has a first input terminal, a second input terminal and an output terminal, wherein the first input terminal is coupled to the first terminal of the first transistor 206 to receive the system voltage Vsys, the second input terminal is coupled to the second terminal of the first transistor 206 to receive the battery voltage Vbatt. Based on the system voltage Vsys and the battery voltage Vbatt, the voltage-to-current converter 221 provides a first current I1 at the output terminal. The voltage divider 222 comprises resistors 211 and 212. The resistor 211 has a first terminal and a second terminal, wherein the first terminal is coupled to the first terminal of the first transistor 206 to receive the system voltage Vsys. The resistor 212 has a first terminal and a second terminal, wherein the first terminal is coupled to the second terminal of the resistor 211 and the output terminal of the voltage-to-current converter 221, the second terminal is coupled to ground, wherein the first terminal of the resistor 212 is configured to provide the system voltage feedback signal FB. In this way, based on the difference between the system voltage Vsys and the battery voltage Vbatt, the voltage-to-current converter 221 dynamically adjust the first current I1, and thus adjusting the system voltage feedback signal FB based on the first current I1.

In the example shown in FIG. 4, the DC/DC voltage regulator 202 comprises a power switch. The voltage regulator control circuit 230 is coupled to a control terminal of the power switch and controls the power switch. As shown in FIG. 4, the voltage regulator 230 is a voltage mode controlled converter. In one embodiment, the voltage regulator 202 is a buck converter with voltage mode control. In other embodiments, the voltage regulator 202 could be a boost converter or other different topologies with voltage mode control.

Based on the system voltage feedback signal FB, the voltage regulator control circuit 230 generates a switch control signal CTRL1 to control the power switch, and accordingly the output voltage of the voltage regulator 202 and the input voltage of the linear charger 205 can be regulated. In one embodiment, when the battery voltage Vbatt is 3V, the system voltage Vsys at the output terminal of the voltage regulator 202 is regulated to be 3.5V. In another embodiment, when the battery voltage Vbatt is 4V, the system voltage Vsys is regulated to be 4.5V. In this way, the power consumed on the linear charger 205 is kept on a minimum value. Although the voltage drop of the linear charger 205 is configured to be 0.5 V in the above embodiments, those skilled in the art should understand that the voltage drop of the linear charger 205 can be other appropriate values, e.g., 0.3V.

In one embodiment, the voltage regulator control circuit 230 comprises an error amplifier 213 and a pulse width modulation (PWM) circuit 213. The error amplifier 213 has a first input terminal, a second input terminal and an output terminal, wherein the first input terminal is coupled to the output terminal of the system voltage feedback circuit 220 to receive the system voltage feedback signal FB, the second input terminal is configured to receive a system voltage reference signal Vref. The output terminal of the error amplifier 213 is coupled to the PWM circuit 213 and provides the switch control signal CTRL1, and thus to regulate the output voltage of the voltage regulator 202. In one embodiment, the voltage-to-current converter 221 and the linear charger 205 can be integrated in a same chip.

Figure 5:
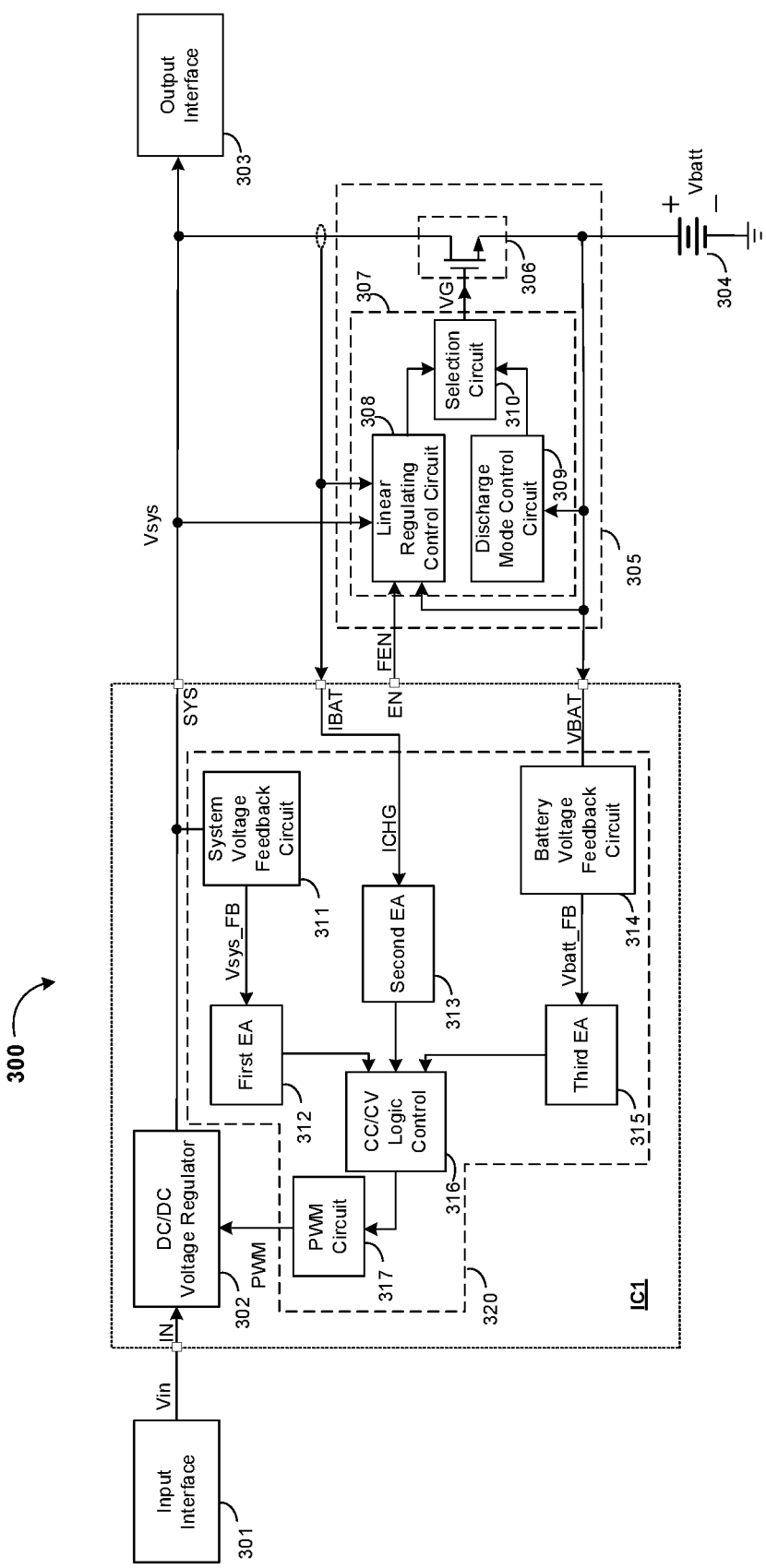
FIG. 5 illustrates a charge system 300 according to yet another embodiment of the present invention.

FIG. 5 illustrates a charge system 300 according to yet another embodiment of the present invention. The charge system 300 comprises an input interface 301, a DC/DC voltage regulator 302, an output interface 303, a rechargeable battery 304, a charging electrical pathway and a discharging electrical pathway. Wherein the charging electrical pathway is from an output terminal of the voltage regulator 302 to the battery 304 through a linear charger 305. The discharging electrical pathway is from the battery 304 to the output interface 303 through the linear charger 305. The voltage regulator 302 is coupled to the input interface 301 and the output interface 303, and is configured to receive a supply voltage Vin from an external power supply and provide a stable system voltage Vsys at the output interface 303 to supply a load. In this way, the linear charger 305 can be used in both the charging electrical pathway and the discharging electrical pathway, and operate in a linear regulating charge mode and a discharge mode, respectively.

The linear charger 305 comprises a first transistor 306 and a first control circuit 307. The first transistor 306 has a first terminal, a second terminal and a control terminal, wherein the first terminal is coupled to the output interface 303 and the output terminal of the voltage regulator 302, the second terminal is coupled to a positive terminal of the battery 304. The first control circuit 307 is coupled to the control terminal of the first transistor 306 and provides a control signal VG to configure the operating mode.

In one embodiment, the first control circuit 307 comprises a linear regulating control circuit 308, a discharge mode control circuit 309 and a selection circuit 310.

When the difference between the battery voltage Vbatt and the system voltage Vsys is higher than the first threshold voltage Vth1, the linear charger 305 enters into the discharge mode from the linear regulating charge mode.

In the linear regulating charge mode, when the battery voltage Vbatt is less than a system voltage minimum value Vsys_min, the linear regulating control circuit 308 is selected to control the first transistor 306, and the second terminal of the first transistor 306 is configured to charge the battery 304 with constant current, and the battery voltage Vbatt continuous to increase. When the battery voltage Vbatt increase to reach the system voltage minimum value Vsys_min, the first transistor 306 is controlled by the linear regulating control circuit 308 to fully on. In other words, the voltage across the first transistor 306 is proportional to a charging current ICHG flowing through the first transistor 306. In a further embodiment, the linear regulating control circuit 308 is configured to control the first transistor 306, and the second terminal of the first transistor 206 is configured to charge the battery 304 with constant voltage.

In the discharge mode, the discharge mode control circuit 309 controls the difference between the battery voltage Vbatt and the system voltage Vsys to be higher than or equal to the second threshold voltage Vth2 (e.g., 25 mV). The second threshold voltage Vth2 is less than the first threshold voltage Vth1. When the difference between the system voltage Vsys and the battery voltage Vbatt is higher than the third threshold voltage Vth3, the first control circuit 307 is configured to block the discharging electrical pathway, and the linear charger 305 exits from the discharge mode and enters to the linear regulating charge mode.

In the example of FIG. 5, the charge system 300 further comprises a voltage regulator control circuit 320 which is integrated with the voltage regulator 302 in an integrated circuit IC1. The voltage regulator 302 works in a switching mode that is different from the linear regulating charge mode or the discharge mode of the linear charger 305. In the example of FIG. 5, the control method of the voltage regulator 302 could be a voltage mode control and/or a current mode control.

As shown in FIG. 5, the integrated circuit IC1 at lease comprises a first pin IN coupled to the input interface 301, a second pin SYS coupled to the output interface 303, a third pin IBAT configured to receive the charging current ICHG that is flowing through the first transistor 306, and a fourth pin VBAT coupled to the positive terminal of the battery 304. In the example shown in FIG. 5, the voltage regulator control circuit 320 comprises a system voltage feedback circuit 311, a first EA 312 for providing a first EA voltage, a second EA 313 for providing a current error signal, a battery voltage feedback circuit 314, a third EA 315 for providing a second EA voltage, a CC/CV logic control circuit 316 and a pulse width modulation circuit 317.

The system voltage feedback circuit 311 is coupled to the second pin SYS to receive the system voltage Vsys, and is configured to provide a system voltage feedback signal Vsys_FB at an output terminal. The battery voltage feedback circuit 314 is coupled to the fourth pin VBAT to receive the battery voltage Vbatt, and is configured to provide a battery voltage feedback signal Vbatt_FB. The first EA 312 is coupled to the output terminal of the system voltage feedback circuit 311 and provides the first EA voltage based on the system voltage feedback signal Vsys_FB. The second EA 313 is coupled to the third pin IBAT to receive the charging current ICHG and provides the current error signal. The third EA 315 is coupled to the fourth pin VBAT to receive the battery voltage VBAT and provides the second EA voltage based on the battery voltage feedback signal Vbatt_FB. The CC/CV logic control circuit 316 has a first input terminal to receive the first EA voltage, a second input terminal to receive the current error signal and a third input terminal to receive the second EA voltage. A maximum value of the first EA voltage, the current error signal and the second EA voltage is selected and is provided at an output terminal. The pulse width modulation circuit 317 receives the maximum value and provides a control signal PWM to regulate the voltage regulator 302.

In one embodiment, the integrated circuit IC1 further comprises an enable pin EN for providing a user control signal FEN, to determine whether to enable a CV charge function of the linear charger 305. The linear regulating control circuit 308 is coupled to the enable pin EN of the integrated circuit IC1, to receive the user control signal FEN provided by the voltage regulator control circuit 320.

The user control signal FEN is programmable by the user. When the charge system 300 is expected to maintain high efficiency and low power operation, the user control signal FEN has a low level, and the CV charge of the linear charger 305 is disabled. When eliminating the effect of the output current ripple of the voltage regulator 302 is required, the user control signal FEN is configured to have a high level, and the CV charge of the linear charger 305 is enabled.

In detail, when the battery voltage Vbatt is higher than the system voltage minimum value Vsys_min and the user control signal FEN is at low level. The linear regulating control circuit 308 control the first transistor 306 to fully on, and the voltage across the first transistor 306 is proportional to the charging current ICHG. When the battery voltage Vbatt is higher than the system voltage minimum value Vsys_min and the user control signal FEN is at high level, the linear regulating control circuit 308 controls the first transistor 306, the second terminal of the first transistor 306 is configured to charge the battery 304 with constant voltage. Typically, when the first transistor 306 is fully on, the conversion efficiency of the linear charger 305 is high. When the CV charge of the linear charger 305 is enabled, the effect of the output ripple of the voltage regulator 302 can be reduced. The output ripple of the charging current ICHG with CV charger is far less than that of the charging current ICHG without CV charge.

Figure 6:
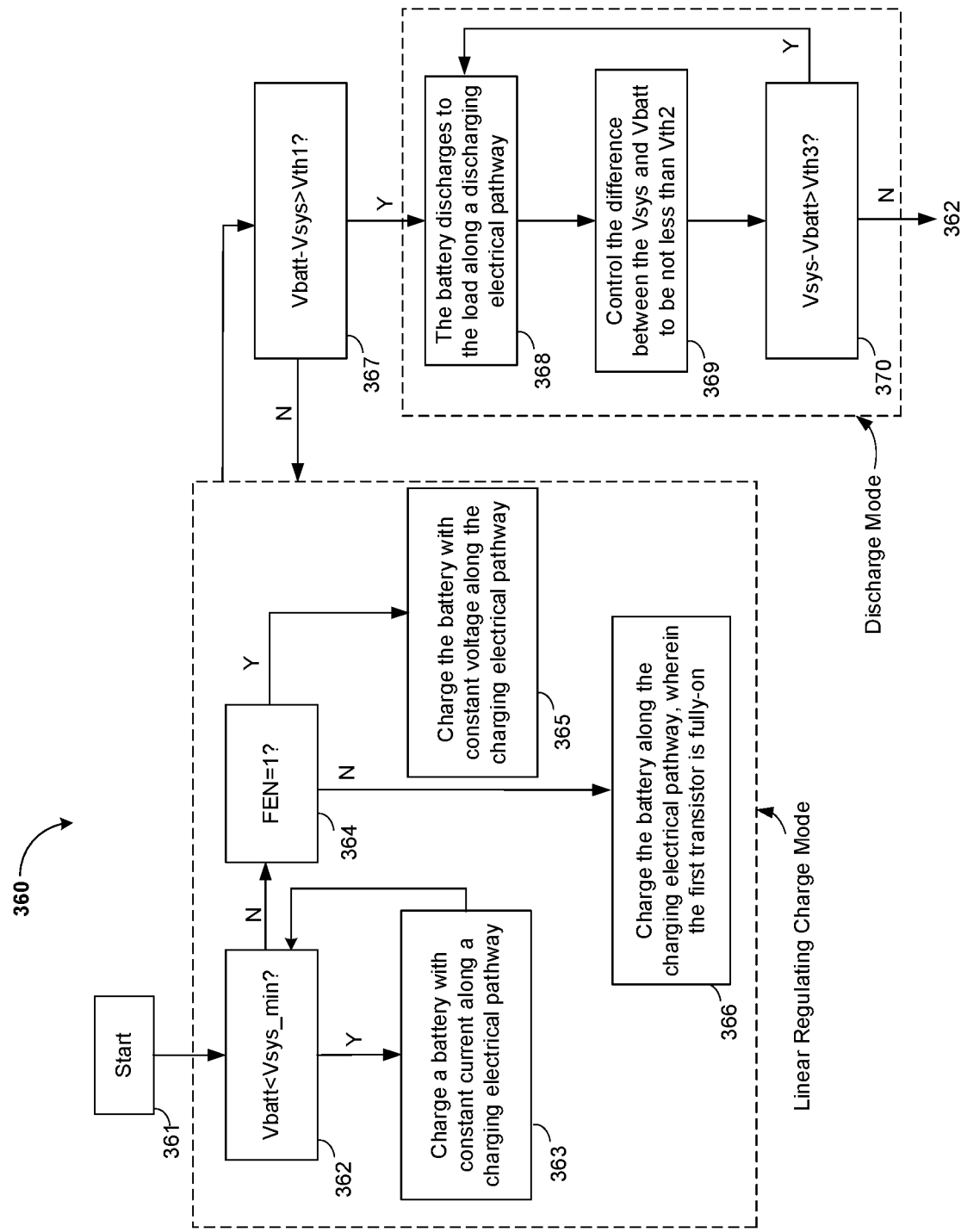
FIG. 6 illustrates a flow chart of an operating method 360 for the charge system 300 shown in FIG. 5 according to one embodiment of the present invention.

FIG. 6 illustrates a flow chart of an operating method 360 for the charge system 300 shown in FIG. 5 according to one embodiment of the present invention. As shown in FIG. 6, the method 360 comprises steps 361~370.

At step 361, the charge system 300 starts to power up, and the linear charger 305 enters into the linear regulating charge mode firstly, to charge the battery 304. The linear regulating charge mode comprises steps 362~366.

At step 362, detect whether the battery voltage Vbatt is less than a system voltage minimum voltage Vsys_min (e.g., 3.6V). If yes, the flow goes into step 363. Otherwise, to the step 364.

At step 363, charge the battery 304 with constant current along the charging electrical pathway. In detail, the second terminal of the first transistor 306 is configured to charge the battery 304 with constant current.

At step 364, detect whether the user control signal FEN is at high level. If the user control signal FEN is at high level, go into step 365. Otherwise, go into step 366.

At step 365, the CV charge of the linear charger 305 is enabled and the second terminal of the first transistor 306 is configured to charge the battery 304 with constant voltage along the charging electrical pathway. In one embodiment, the steps 364 and 365 are optional.

At step 366, charge the battery 304 along the charging electrical pathway, and the first transistor 306 is fully on.

At step 367, whether the difference between the battery voltage Vbatt and the system voltage Vsys is higher than the first threshold voltage Vth1 is sensed. In one embodiment, Vth1=30 mV. If yes, the flow enters to the discharge mode from the linear regulating charge mode, and goes into step 368. The discharge mode comprises steps 368~370.

At step 368, the battery 304 discharges along the discharging electrical pathway, to supply the load coupled to the output interface 303.

At step 369, the difference between the system voltage Vsys and the battery voltage Vbatt is controlled to be higher than or equal to the second threshold voltage Vth2. In one embodiment, Vth2=25 mV.

At step 370, whether the difference between the system voltage Vsys and the battery voltage Vbatt is higher than the third threshold voltage Vth3 is sensed. If yes, the linear charger 205 enters the linear regulating charge mode and exits from the discharge mode, and the discharging electrical pathway is blocked. Otherwise, back to step 368 and keep the discharge mode.

Figure 7:
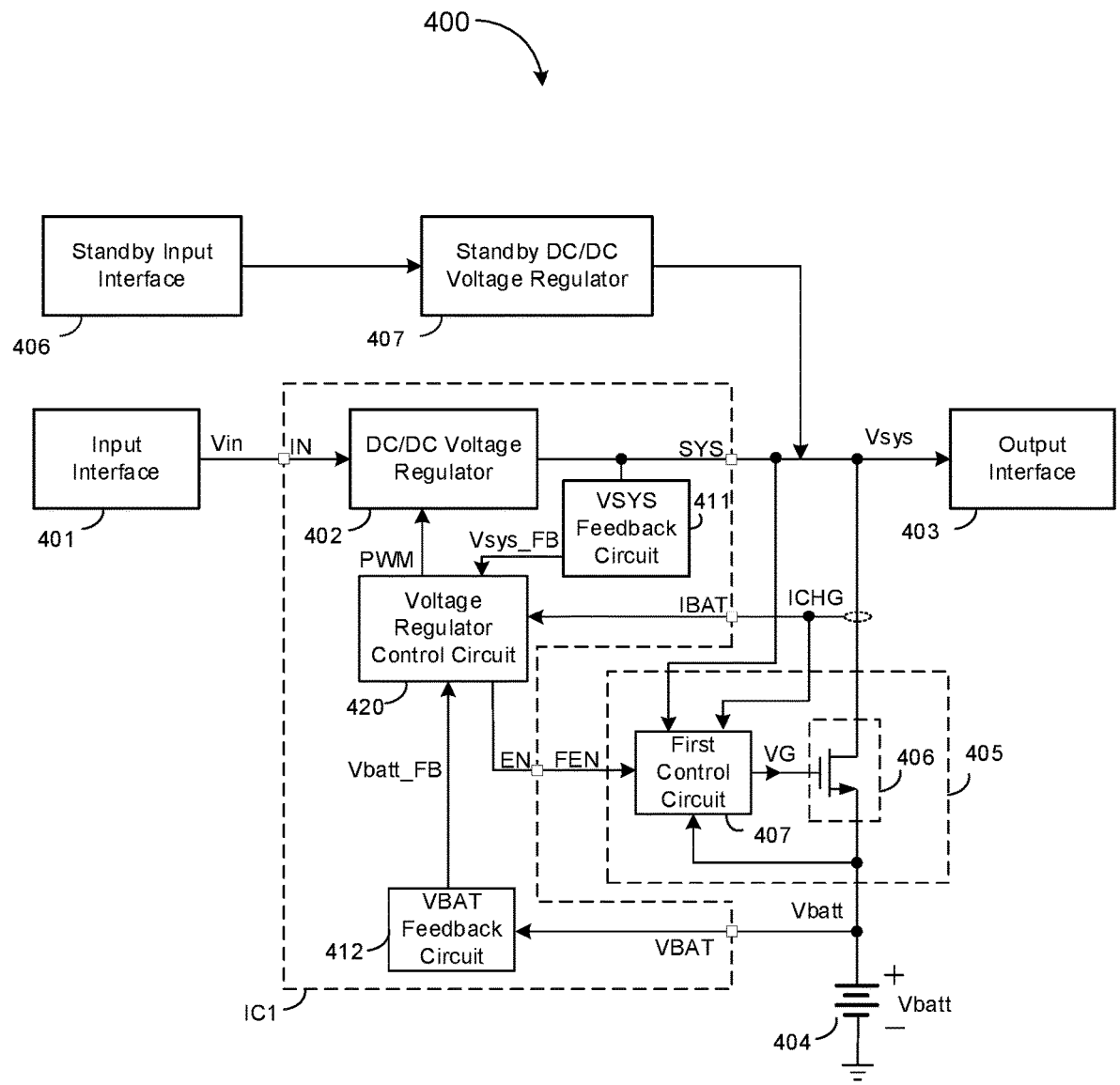
FIG. 7 illustrates a charge system 400 according to another embodiment of the present invention.

FIG. 7 illustrates a charge system 400 according to another embodiment of the present invention. Compared with the charge system 300 shown in FIG. 5, the difference is that the charge system 400 shown in FIG. 7 further comprises a standby input interface 306, a standby DC/DC voltage regulator 407, and a standby charging electrical pathway. Wherein the standby charging electrical pathway is from the standby input interface 406 to the output interface 403 through the standby DC/DC voltage regulator 407. When an external power supply coupled to the input interface 401 fails, an output terminal of the standby DC/DC voltage regulator 407 supplies the load along the standby charging electrical pathway.

Figure 8:
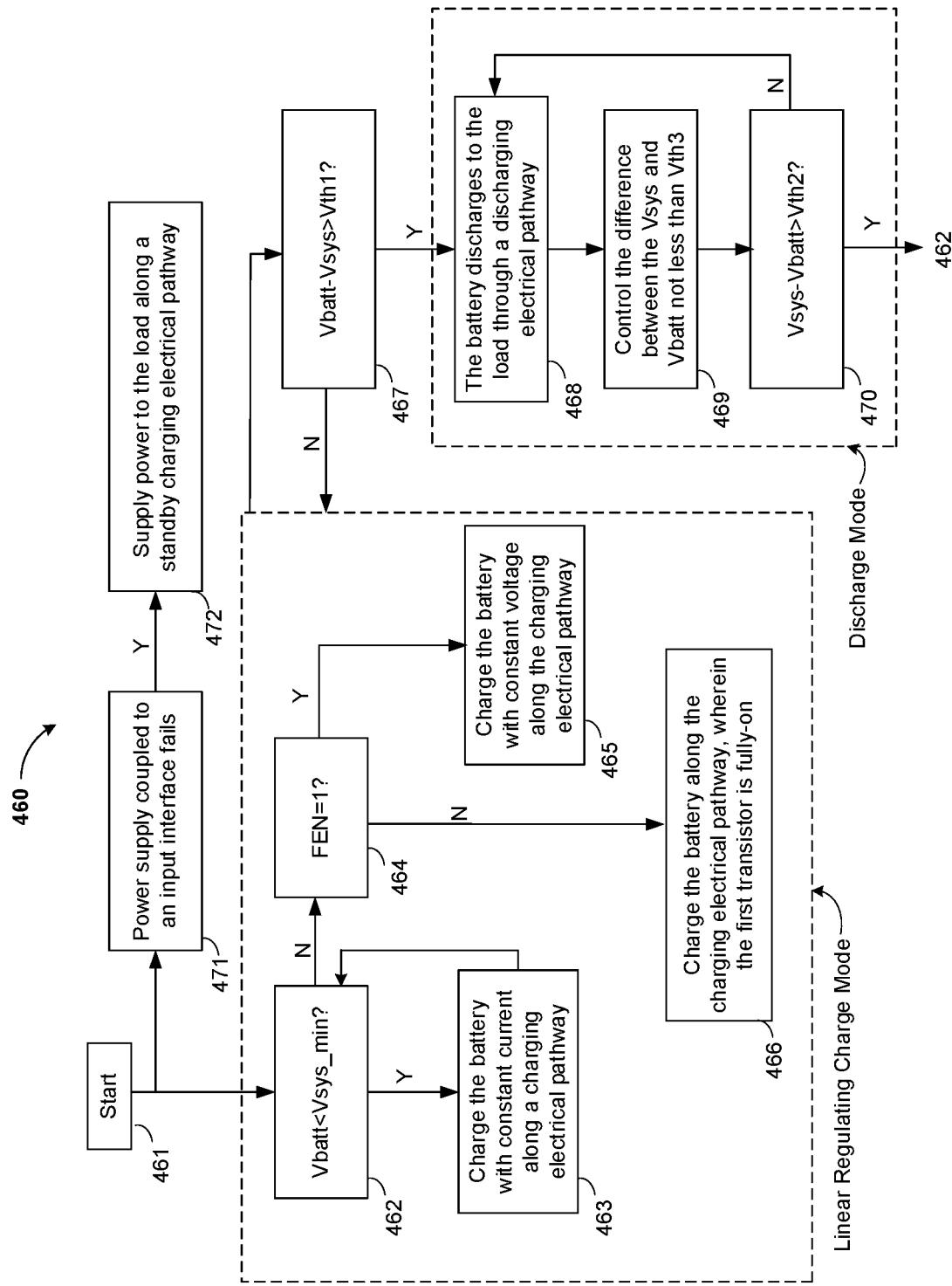
FIG. 8 illustrates a flow chart of an operating method 460 for the charge system 400 shown in FIG. 7 according to one embodiment of the present invention.

FIG. 8 illustrates a flow chart of an operating method 460 for the charge system 400 shown in FIG. 7 according to one embodiment of the present invention. As shown in FIG. 8, the method 460 comprises steps 461~472. Compared the method 460 shown in FIG. 8 with the method 360 shown in FIG. 6, the method 460 further comprises steps 471 and 472.

At step 471, detect whether the external power supply coupled to the input interface 401 is available. If yes, go to step 472. At step 472, the output terminal of the standby DC/DC voltage regulator 407 supplies the load along the standby charging electrical pathway.

In this document, relational terms such as first and second, and the like may be used solely to distinguish one entity or action from another entity or action without necessarily requiring or implying any actual such relationship or order between such entities or actions. Numerical ordinals such as "first," "second," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A charge system for supplying a load, comprising:
an input interface configured to receive a supply voltage;
an output interface configured to output a system voltage to the load;
a DC/DC voltage regulator coupled between the input interface and the output interface and configured to convert the supply voltage into the system voltage;
a charging electrical pathway from an output terminal of the DC/DC voltage regulator to a battery through a linear charger;
a discharge electrical pathway from the battery to the output interface through the linear charger; and
wherein the linear charger is configured to operate in a linear regulating charge mode along the charging electrical pathway and operate in a discharge mode along the discharge electrical pathway; and
wherein the linear charger comprises:
a first transistor has a first terminal, a second terminal and a control terminal, wherein the first terminal is coupled to the output terminal of the DC/DC voltage regulator, and the second terminal is configured to be coupled to the battery; and
a first control circuit coupled to the control terminal of the first transistor for providing a control signal of the first transistor, wherein the first control circuit comprises:
a linear regulating control circuit configured to provide a linear regulating control signal;
a discharging control circuit configured to provide a discharge mode control signal; and a selection circuit configured to select the linear regulating control signal or the discharge mode control signal as the control signal to control the first transistor.

2. The charge system of claim 1, wherein when a difference between the battery voltage and the system voltage exceeds a first threshold voltage, the linear charger enters into the discharge mode and exits from the linear regulating charge mode.

3. The charge system of claim 2, wherein when the linear charger operates in the discharge mode, the difference between the battery voltage and the system voltage is controlled to be not less than a second threshold voltage, wherein the second threshold voltage is less than the first threshold voltage.

4. The charge system of claim 2, wherein when a difference between the system voltage and the battery voltage exceeds a third threshold voltage, the linear charger enters into the linear regulating charge mode and exits from the discharge mode, wherein the third threshold voltage is higher than the first threshold voltage.

5. The charge system of claim 1, wherein the linear regulating control circuit is configured to receive a user control signal that determines whether to enable a constant voltage charge of the linear charger to charge the battery.

6. The charge system of claim 1, wherein when the linear charger operates in the linear regulating charge mode:
when the difference between the system voltage and the battery voltage exceeds the third threshold voltage, the second terminal of the first transistor is controlled to charge the battery with a constant current and the battery voltage continuous to increase; and
when the battery voltage increases to reach a battery regulating voltage, the second terminal of the first transistor is controlled to charge the battery with a constant voltage and the battery voltage keeps constant.

7. The charge system of claim 1, wherein when the linear charger operates in the linear regulating charge mode:
when the battery voltage is less than a system voltage minimum voltage, the second terminal of the first transistor charges the battery with a constant current, and the battery voltage continuous to increase; and
when the battery voltage is higher than the system voltage minimum voltage, the first transistor is controlled to be fully on.

8. The charge system of claim 1, further comprises:
a system voltage feedback circuit configured to provide a system voltage feedback signal based on the system voltage and the battery voltage, and the system voltage feedback signal is used to regulate the output voltage of the voltage regulator to substantially equal to a sum of the battery voltage and a voltage across the first transistor.

9. The charge system of claim 7, wherein the system voltage feedback circuit comprises:
a voltage-to-current converter having a first input terminal, a second input terminal and an output terminal, wherein the first input terminal is coupled to the first terminal of the first transistor to receive the system voltage, the second input terminal is coupled to the second terminal of the first transistor to receive the battery voltage, and wherein based on the system voltage and the battery voltage, the voltage-to-current converter provides a first current;

a first resistor having a first terminal and a second terminal, wherein the first terminal is coupled to the first terminal of the first transistor to receive the system voltage; and
a second resistor having a first terminal and a second terminal, wherein the first terminal is coupled to the second terminal of the first resistor and the output terminal of the voltage-to-current converter, the second terminal is coupled to ground, wherein the first terminal of the second resistor provides the system voltage feedback signal.

10. A method of operating a charge system, wherein the charge system has an input interface, an output interface for providing a system voltage to a load, a DC/DC voltage regulator coupled between the input interface and the output interface, a charging electrical pathway from an output terminal of the DC/DC voltage regulator to a battery through a linear charger, and a discharge electrical pathway from the battery to the output interface through the linear charger, wherein the method comprising:
configuring the linear charger to operate in a linear regulating charge mode, to charge the battery along the charging electrical pathway; and
when a difference between the battery voltage and the system voltage is higher than a first threshold voltage, switching the linear charger to a discharge mode from the linear regulating charge mode, along the discharge electrical pathway to supply power to the load; and
wherein in the linear regulating charge mode:
receiving a user control signal that determines whether to enable a constant voltage charge of the linear charger; and
when the battery voltage exceeds a system voltage minimum voltage and the user control signal is asserted, enabling the linear charger to charge the battery with constant voltage.

11. The method of claim 10, wherein in the discharge mode, the difference between the battery voltage and the system voltage is controlled to be higher than or equal to a second threshold voltage, wherein the second threshold voltage is less than the first threshold voltage.

12. The method of claim 10, wherein when a difference between the system voltage and the battery voltage is higher than a third threshold voltage, switching the linear charger to the linear regulating charge mode from the discharge mode, wherein the third threshold voltage is higher than the first threshold voltage.

13. The method of claim 12, wherein in the linear regulating charge mode:
when the difference between the system voltage and the battery voltage is higher than the third threshold voltage, configuring the linear charger to charge the battery with constant current, the battery voltage continuous to increase; and
when the battery voltage increases to reach a battery regulating voltage, configuring the linear charger to charge the battery with constant voltage, the battery voltage remains constant.

14. The method of claim 12, wherein in the linear regulating charge mode, generating a system voltage feedback signal based on the system voltage and the battery voltage, to regulate the system voltage to approach a sum of the voltage across the linear charger and the battery voltage.

15. The method of claim 12, wherein during the linear regulating charge mode:
when the battery voltage is less than a system voltage minimum voltage, configuring the linear charger to charge the battery with constant current, the battery voltage continuous to increase; and when the battery voltage exceeds the system voltage minimum voltage, configuring the first transistor to fully on.

* * * * *